G. S. BARTLETT.
BRACKET SUPPORT.
APPLICATION FILED NOV. 13, 1919.
1,396,548. Patented Nov. 8, 1921.
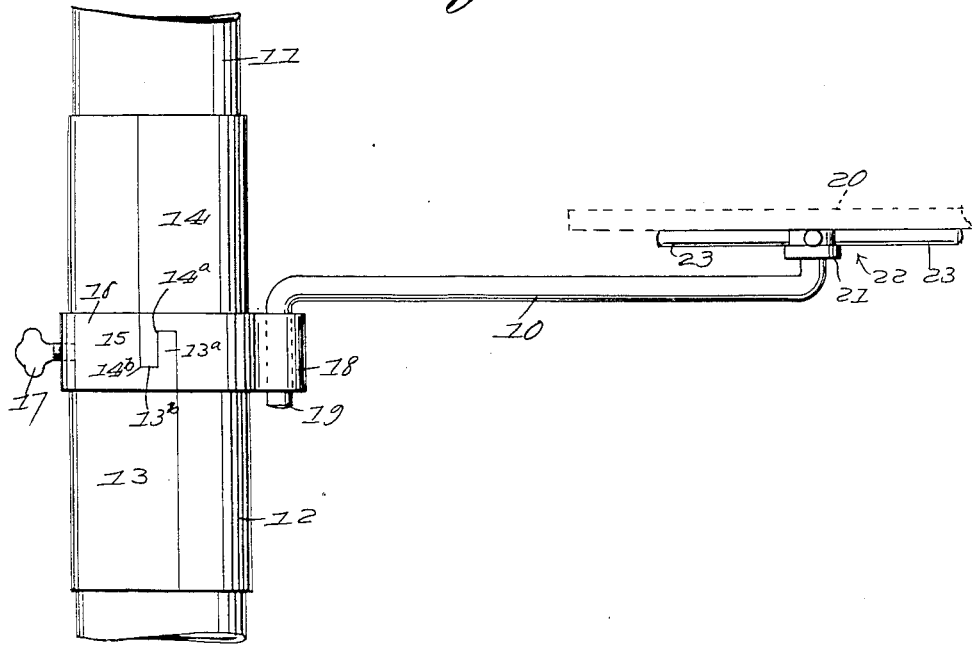
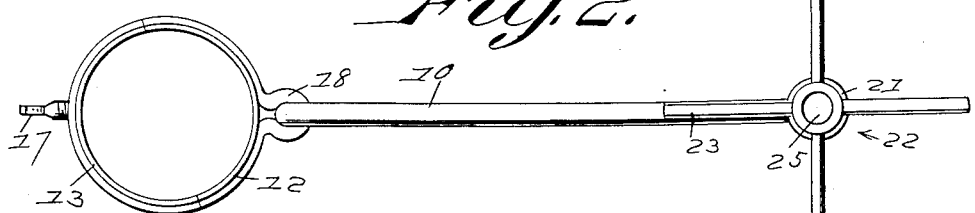
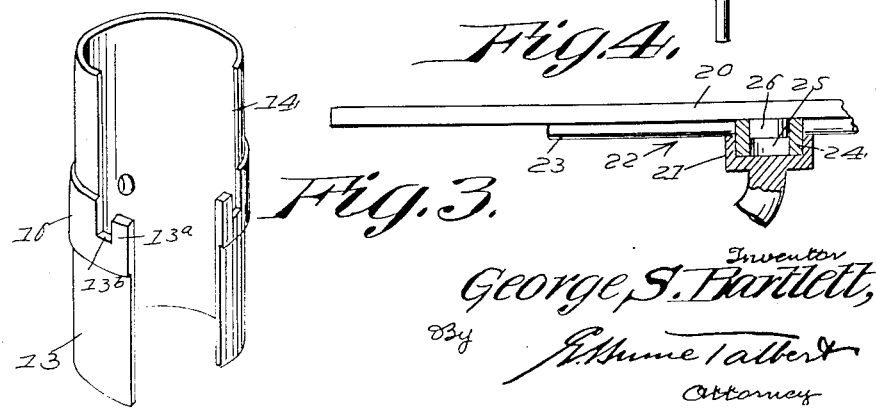
George S. Bartlett, Inventor

UNITED STATES PATENT OFFICE.

GEORGE S. BARTLETT, OF BUFFALO, WYOMING.

BRACKET-SUPPORT.

1,396,548.   Specification of Letters Patent.   Patented Nov. 8, 1921.

Application filed November 13, 1919. Serial No. 337,777.

*To all whom it may concern:*

Be it known that GEORGE S. BARTLETT, a citizen of the United States of America, residing at Buffalo, in the county of Johnson and State of Wyoming, has invented new and useful Improvements in Bracket-Supports, of which the following is a specification.

The object of the invention is to provide a simple and convenient means for the attachment to a vertical support such as the upright or post of a bedstead head or the like to serve as a mounting for a bracket adapted to carry a table, tray, writing desk, book rest or the equivalent thereof, under such conditions as to permit of moving said tray or rest or other object carried by the bracket over the bed within convenient reach of the occupant thereof or to be moved to one side out of the way when not in use; and to this end the invention consists in a construction, combination and arrangement of parts of which a preferred embodiment is shown in the accompanying drawing, wherein:

Figure 1 is a side view of the device.

Fig. 2 is a plan view of the same.

Fig. 3 is a perspective view of one member of the clamping sleeve.

Fig. 4 is a detail sectional view showing the mounting of the tray on the arm of the bracket under such conditions as to permit of rotating the former independently of the bracket arm.

It is desired in connection with devices of this class to provide means for mounting a bracket arm such as that indicated at 10, upon a bedpost or other upright 11 under such conditions as to securely maintain the bracket in position without necessitating any modification in or any marring or mutilation of said post, and to this end there is employed a clamp indicated at 12 consisting of the detachable members 13 and 14, each of which is of substantially semi-cylindrical cross section having an interlocking joint at 15, preferably formed in a thickened or reinforced portion 16 of the clamp members, one of said members carrying a thumb screw 17 for terminal engagement with the post or upright 11, and the other being provided with a bearing eye 18 for the reception of the pintle 19 of said bracket element and from which the latter is disengageable to dismount the arm.

In applying the clamp sleeve to the post or upright 11 it is simply necessary to apply the separable members 13 and 14 thereof to opposite sides of the said upright or post, which obviously may be of any preferred cross sectional contour and dimensions, and slide one of the members longitudinally relative to the other to cause the engagement of the tongues 13$^a$ of one member with the notches or recesses 14$^a$ of the other member, and the tongues 14$^b$ of the last-named member with the notches or seats 13$^b$ of the first-named member to provide an interlock which, when the thumb screw or set screw 17 is tightened serves to maintain the sleeve in engagement with the upright or post against displacement either transversely or longitudinally thereof.

As will be understood the bracket arm is capable of a swinging movement to present its inner or free end over the bed or other object in connection with which the bracket is used, or to be swung to an out-of-the-way position at one side of the bed or other structure, and in order to adapt the same to hold objects such as a tray 20 or its equivalent, the said outer or free end of the bracket arm is provided with a socket 21 in which is seated a spider 22 having radial arms 23 and a hub 24, said hub preferably having an open center to form a socket 25 for the reception of a central stud 26 on the tray. The tray may be displaced and other devices such as a book rest, typewriter support or the equivalent thereof may be substituted, or both the tray and the spider may be displaced or, as above indicated, the bracket may be dismounted from the bearing eye 18 and remounted from time to time as may be required.

Moreover the engagement of the clamp with the upright or post is such that its removal will relieve the latter in practically the same condition as before it was applied, owing to the fact that the engagement thereof with the upright is through frictional or bearing contact, and therefore the marring or mutilation of the same or any surface finish with which it may be provided is not marred or mutilated.

What is claimed is:

A device for the purpose described having a clamp for engagement with a post or upright and provided with a set screw for securing the clamp in position thereon, an arm pivotally mounted for swinging movement upon the clamp and provided at its free end with a seat, and a spider having a hub revolubly mounted in said seat and provided with a socket for the reception of a depending stud on a tray or similar object resting thereon.

In testimony whereof he affixes his signature.

GEORGE S. BARTLETT.